US012380752B2

(12) United States Patent
Harada et al.

(10) Patent No.: US 12,380,752 B2
(45) Date of Patent: Aug. 5, 2025

(54) SYSTEM, METHOD AND COMPUTER PROGRAM PRODUCT FOR AUTOMATICALLY OPENING A GATE OF A PUBLIC TRANSPORT STATION

(71) Applicant: Hitachi, Ltd., Tokyo (JP)

(72) Inventors: Satoru Harada, London (GB);
Shuichiro Sakikawa, London (GB);
Yutaka Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 18 days.

(21) Appl. No.: 18/279,244

(22) PCT Filed: Mar. 17, 2022

(86) PCT No.: PCT/EP2022/057072
§ 371 (c)(1),
(2) Date: Aug. 29, 2023

(87) PCT Pub. No.: WO2022/200185
PCT Pub. Date: Sep. 29, 2022

(65) Prior Publication Data
US 2024/0153330 A1      May 9, 2024

(30) Foreign Application Priority Data

Mar. 23, 2021 (EP) .................................. 21164341

(51) Int. Cl.
*G07C 9/10* (2020.01)
*G07C 9/27* (2020.01)
*G07C 9/28* (2020.01)

(52) U.S. Cl.
CPC ............... *G07C 9/10* (2020.01); *G07C 9/27* (2020.01); *G07C 9/28* (2020.01)

(58) Field of Classification Search
CPC ............ G07C 9/10; G07C 9/27; G07C 9/28
See application file for complete search history.

(56) References Cited

U.S. PATENT DOCUMENTS

| 2015/0120558 A1 | 4/2015 | Andrews et al. |
| 2016/0055693 A1* | 2/2016 | Somani .................. G07C 9/28 |
| | | 340/5.61 |

(Continued)

FOREIGN PATENT DOCUMENTS

| EP | 2 991 041 A2 | 3/2016 |
| EP | 3 045 931 A1 | 7/2016 |

OTHER PUBLICATIONS

International Search Report (PCT/ISA/210) issued in PCT Application No. PCT/EP2022/057072 dated Jul. 8, 2022 with English translation (2 pages).

(Continued)

*Primary Examiner* — Nabil H Syed
(74) *Attorney, Agent, or Firm* — Crowell & Moring LLP

(57) ABSTRACT

A system for automatically opening a gate of a public transport station may comprise a plurality of transmitters (1201, 1301), a mobile device (1100) of a passenger reaching the plurality of gates and a plurality of gate control devices (1210, 1310) controlling the plurality of gates (1200, 1300). Each transmitter may be installed at one of a plurality of gates (1200, 1300) and may send a transmitter signal including a gate identifier identifying the respective gate. The passenger's mobile device (1100) may receive a plurality of transmitter signals from the plurality of transmitters (1201, 1301), select one of the plurality of received transmitter signals based on a signal characteristic of the received transmitter signals, read the gate identifier included in the selected transmitter signal, and transmit a validation signal including the gate identifier of the selected transmitter signal and a user identifier of the passenger's mobile device (1100) to the plurality of gate control devices (1210, 1310). Each gate control device (1200, 1300) may receive the validation signal from the passenger's mobile device (1100), compare the gate identifier included in the received validation signal (Continued)

with a gate identifier of the gate (1200, 1300) controlled by the gate control device (1210, 1310), and open the gate (1200, 1300) if the gate identifier included in the received validation signal corresponds to the gate identifier of the gate (1200, 1300) controlled by the gate control device (1210, 1310).

15 Claims, 8 Drawing Sheets

(56) References Cited

U.S. PATENT DOCUMENTS

2019/0122475 A1    4/2019   Dyne et al.
2020/0336879 A1    10/2020   Gravelle et al.

OTHER PUBLICATIONS

Written Opinion (PCT/ISA/237) issued in PCT Application No. PCT/EP2022/057072 dated Jul. 8, 2022 (8 pages).
European Office Action issued in European Application No. 21 164 341.6 dated Jun. 4, 2024 (7 pages).

\* cited by examiner

Fig. 3a  1001

| Gate ID | Location |
|---------|----------|
| 01000 | Station A |
| 01001 | Station A |
| 02000 | Station B |
| 02001 | Station B |
| 02002 | Station B |

Fig. 3b  1002

| User ID | Location | Time | Status |
|---------|----------|------|--------|
| User A | Station A | 10:00:00 | In |
| User B | Station B | 09:30:05 | In |
| User C | Station C | 10:15:05 | In |
| User C | Station C | 11:20:10 | Out |

Fig. 3c  1104

| Time | Gate ID | Received Power |
|------|---------|----------------|
| 10:00:00 | 1000 | -90(dBm) |
| 10:00:01 | 1001 | -60(dBm) |

SYSTEM, METHOD AND COMPUTER PROGRAM PRODUCT FOR AUTOMATICALLY OPENING A GATE OF A PUBLIC TRANSPORT STATION

The present subject matter in particular relates to a system for automatically opening a gate of a public transport station for a passenger by using a mobile device. A corresponding method and computer program product are provided as well.

Mobile computer based public transportation management systems are increasingly common. These systems, for example, determine when a passenger gets on and off different stations/means of transport, determine the travelling route which was taken by the passenger and some may even calculate the fare based on the passengers' location information provided by the passengers' mobile devices. A passenger only carry a mobile device when using such a system. In the following a passenger equipped with a mobile device is referred to as a user.

Patent Literature 1 describes a method for determining a location history of a mobile device. Different states corresponding to different reachable road segments associated with a road network are determined based on several initial estimated locations of the mobile device, and a mobility model defining transition probabilities between the determined states is generated.

Patent Literature 1: EP 3045931 A1

The disclosed system for automatically opening a gate of a public transport station is part of a mobile computer based public transportation management systems as described above. The present disclosure addresses the technical object of improving the flow of passengers through a station without increasing the computational and measuring efforts of a present mobile computer based public transportation management system. This object is achieved by the subject matter of the appended claims.

According to aspects of the present disclosure, there is proposed a gate system including a plurality of gates which can open automatically and a system for opening a gate of a public transport station automatically comprising a plurality of transmitters, at least one mobile device of a passenger and a gate system including a plurality of gates controlled by a plurality of gate control devices. Said system for opening a gate of a public transport station preferably includes the gate system as claimed by appended claim 1.

A public transport station may preferably be a train station, a bus station, or the like having entrances/exits to the station, to one or more platforms of the station and/or to one or more public means of transport such as trains or busses.

A gate of a public transport station may preferably be an automatically opening electric passenger gate comprising a turnstile, a swing door or any other movable barrier that enables a single passenger to pass through the gate in entrance or exit direction. The gate may be located at an entrance/exit of a public transport station and/or at an entrance/exit of a platform. The gate may also be located inside a public transport station and separate different platforms from one another. Alternatively or additionally, the gate may be located at an entrance/exit of a public means of transport such as a station platform screen door separating platform and rails. The plurality of gates which are controlled by the present system may even be located close to each other without impairing the present system's function.

The plurality of transmitters may be implemented using any appropriate hardware and/or software configured for wireless communication with a mobile device of a passenger. In particular, a transmitter may act as a stand-alone device including a processor, communication module, and/or network interface component configured to communicate with a mobile device of a passenger, the plurality of gate control devices and/or a service provider server. Preferably, a transmitter emits signals in a predefined range around the transmitter periodically and/or constantly. The plurality of transmitters may preferably comprise UWB (ultra-wideband) tags, active RFID (radio-frequency identification) tags, WLAN (wireless local area network) tags and/or BLE (Bluetooth low energy; Bluetooth is a registered trademark) tags ("beacons"). Any other transmitter suitable to act as a stand-alone device and emit signals in a predefined range around the transmitter periodically and/or constantly may be used as well. The predefined transmission range of the transmitter may preferably in the range of 0.1 m to 100 m. Most preferably the predefined transmission range of the transmitter may be in the range of 0.1 m to 10 m.

Each transmitter may be installed at one of a plurality of gates and may send a transmitter signal including a gate identifier identifying the respective gate. The term "installed at" shall be understood in the sense of "connected to", "mounted on" and/or "included in". Identifying a gate by a gate identifier shall include that each gate has an exclusive gate identifier pinpointing the respective gate.

A mobile device of a passenger reaching the plurality of gates may receive a plurality of transmitter signals from the plurality of transmitters and may select one of the plurality of received transmitter signals based on a signal characteristic of the received transmitter signals. The term "reaching" may mean that a passenger is approaching the gates or that the passenger is getting closer thereto or that the passenger arrives within a certain, definable range/vicinity of the gates. Preferably, the passenger's mobile device may select (automatically) the transmitter signal having the highest signal strength and/or the highest signal frequency as will be described below. Since the signal strength and the signal frequency correspond to the distance of a user to a transmitter, the signal received from the transmitter closest to the user may be selected.

This means that the passenger's mobile device may interact with the transmitters sending a transmitter signal via a radio signal or the like that can be received wirelessly by the mobile device when it is positioned within range of the transmitter signals. The mobile device may be a smartphone, a tablet, a laptop, a smart watch, or the like. The mobile device may further preferably have a graphic user interface for displaying relevant information to the user of the mobile device.

The plurality of gate control devices may be connected to the gates to be controlled. In particular, each gate control device may be connected to a single gate. A gate control device may preferably be included in the gate or attached to the gate. It may also be possible that a gate control device is positioned remote from the gate. Each gate control device may be electrically connected to the gate to be controlled via a cable or wirelessly. Furthermore, each gate control device may receive the gate identifier of the connected gate from the transmitter installed at the connected gate, and/or from a data storage in which the gate identifier of the connected gate may be stored. Any other possibility for a gate control device to receive the gate identifier of the connected gate can also be used. Each gate control device may further be configured to communicate with a mobile device of a passenger and/or stationary server.

Furthermore, the passenger's mobile device may read the gate identifier included in the selected transmitter signal and may transmit a validation signal including the gate identifier of the selected transmitter signal and a user identifier of the passenger's mobile device to the plurality of gate control devices controlling the plurality of gates. The user identifier may be an identifier which unambiguously defines the passenger's mobile in the context of a mobile computer based public transportation management system. In other words, the validation signal can be used to identify the gate selected for entering/leaving a station/platform as well as the user intending to enter or leave the station/platform through the selected gate.

Each of the plurality of gate control devices may receive the validation signal from the passenger's mobile device and may compare the gate identifier included in the received validation signal with a gate identifier of the gate controlled by the gate control device.

A gate control device may open the gate if the gate identifier included in the received validation signal corresponds to the gate identifier of the gate controlled by the gate control device. In other words, a comparison is made between the gate identifier included in the received validation signal and the gate identifier of the gate connected to the control device. If the gate identifier included in the validation signal matches to the gate identifier of the gate to which the gate controller is connected, the gate controller may open the gate.

The disclosed subject matter allows for improving the flow of passengers through a station by automatically opening a gate of a public transport station for a passenger equipped with a mobile device (user) when the user arrives at the gate. It may also possible to direct a user through the nearest gate when he/she reaches a plurality of gates installed at an entrance/exit of a station/platform. This enables to optimize the users' route within the station without increasing the computational and measuring effort of a present mobile computer based public transportation management system. Instead, components of an existing system can be synergistically used to automatically and hands-free opening a gate located closest to a user.

According to a preferred aspect, the signal characteristic of the received transmitter signals may be a signal strength and/or a signal frequency. The signal strength may preferably be represented by the RSSI value (received signal strength indication) referring to a signal power level determined in a calibration process one meter away from the transmitter. For example, the RSSI value may be in a range of −120 dbm to 0 dbm. The higher the RSSI value (i.e., the closer the RSSI value to 0 dbm), the closer the user is located to a transmitter, and thus to the gate to be passed. This means that the passenger's mobile device may select the transmitter signal having the highest RSSI value. In order to avoid that a gate is selected when the user is still too far away to pass the gate immediately, a predefined RSSI threshold value may be defined for the received transmitter signals, which must be exceeded by each transmitter signal before the signal with the highest RSSI value can be selected.

Alternatively or additionally, the distance to a transmitter installed at a gate may be determined using a signal frequency. The signal frequency may be the frequency by which a passenger's mobile device receive a periodically sent transmitter signal. The higher the frequency, the closer the user is located to a transmitter, and thus to a gate to be passed. This means that the passenger's mobile device may select the transmitter signal having the highest signal frequency.

The gate identifier of each transmitter signal received by the passenger's mobile device may preferably be stored in a gate identifier list and provided with a time stamp. Additionally, the signal strength may preferably be stored in the gate identifier list.

For example, the signal frequency may be determined based on the sum of the number of gate identifiers stored in the gate identifier list at a specific time or during a specific time period. As a particular example, the signal frequency may be determined by dividing the sum of the number of gate identifiers stored in the gate identifier list by a specific time period starting. The specific time period may be determined based on the time period from the first specific time when a gate identifier is stored in the gate identifier list to the last specific time when the gate identifier is stored in the gate identifier list.

If a validation signal including the selected gate identifier is transmitted to the gate control units, the gate identifier list may be cleared. The above-described procedure allows for automatically opening the gate closest to the user by means of its mobile device without the need for complex distance measurement equipment. Determining the signal strength and/or the signal frequency based on data already integrated in the gate identifier list also helps to reduce computational effort for analysing the received transmitter signals.

According to a preferred aspect, the system may comprise a back office including a back-office data storage unit for storing user status data of a plurality of mobile devices of passengers in a user status management table. The back office may preferably be a stationary server or a plurality of stationary servers. The term "back office" shall generally describe a remotely located computer facility, such as remote computer(s), server(s), processor(s), storage device (s), and the like. The server(s) may further preferably be connected to a mobile device of a passenger and the plurality of gate control units via a wireless data connection such as the internet, a mobile network, or a wireless local area network.

The back-office data storage unit may be a data storage unit, which can store information storable in a in a gate identifier table and a user status management table. The back-office data storage unit may preferably be an internal storage unit for storing, among others, user status data of a plurality of mobile devices of passengers in a database which is preferably structured as a table, another suitable data format or the like. The data storage may preferable be provided with the stationary server/the plurality of stationary servers. It may also be possible that the data storage is provided with the passenger's mobile device or another remote location. The data storage may also be distributed over different storage places.

The gate identifier table may preferably be configured to store a gate identifier corresponding to a location of the gate identified by the gate identifier.

The user status management table may preferably be configured to store a user identifier of each passenger's mobile device, a location of a user/passenger's mobile device, a time stamp indicating the time of determining the location of the user/the passenger's mobile device and a user status.

The back office may further comprise a user status management unit which may receive a user status request including the user identifier of the passenger's mobile device from the gate control device controlling the gate to be opened. The user status management unit of the back office may read a previous user status from the user status management table.

The term "user status" may be understood as the status of a passenger equipped with a mobile device (user) using a facility of public transportation such as a train station or bus station and its corresponding means of transportation such as train or bus. This may include activities such as waiting for a means of transportation at a respective station, being onboard a means transportation or entering a station, being inside/outside a station or the like.

The user status may preferably include "inside" and "outside", wherein "inside" indicates that the passenger equipped with his/her mobile device (user) is positioned inside a station/platform and "outside" indicates that the passenger is positioned "outside" a station/platform.

Based on the user identifier included in the received status request the user status management unit may determine a current user status based on the previous user status. In other words, the user status management unit may identify the status data of a passenger equipped with a mobile device (user) stored in the user status management table via the received user identifier and may read out the user status of the identified user with the latest time stamp from the user status management table as previous user status.

Furthermore, the user status management unit of the back office may transmit the current user status to the gate control device controlling the gate to be opened. The current user status may be understood as a status a user intending to pass a gate may achieve by passing the gate. The gate control device controlling the gate to be opened may receive the current user status and may determine an opening direction of the gate according to the received current user status so that the gate can be automatically opened for the user in the correct direction without time lag.

According to a preferred aspect of the system, the user status management unit of the back office may determine the current user status to be "inside" if no previous user status is stored in the user status management table. In this case, it is assumed that the user must be outside a station/platform, since no status information is available. In other words, it is assumed that the previous user status is "outside". Furthermore, the user status management unit of the back office may determine the current user status to be "inside" if the previous user status stored in the user status management table is "outside". By determining the door opening direction on the basis of data tables already stored in the back-office data storage unit, the user status does not have to be calculated, so that no additional computing effort is required.

Furthermore, the user status management unit of the back office may determine the current user status to be "outside" if the previous user status stored in the user status management table is "inside".

According to a preferred aspect of the system, the gate control device may control the gate to be opened to open in entrance direction if the current user status is "inside" and may control the gate to be opened in exit direction if the current user status is "outside".

According to an aspect of the system, the user status management unit of the back office may determine a current location of a user based on the gate identifier included in the received status request. The current location of the user can be determined by determining the location of the gate that the user has just passed using the gate identifier table in which each gate identifier may be stored in connection with the location of the corresponding gate.

Further, the user status management unit may update the user status management table according to the determined current user status and the determined current location of the user. In other words, the user status management unit may write the current user status provided with a time stamp as well as the current user location in the respective columns of the status management table.

According to a preferred aspect of the system, the passenger's mobile device may include a transmitter signal receiver unit, which may receive a plurality of transmitter signals each including a gate identifier from a plurality of transmitters installed at a plurality of gates. The transmitter signal receiver unit may receive the transmitter signals via a wireless communication such as a wireless local area network, Bluetooth low energy (Bluetooth is a registered trademark), ultra-wideband and the like. Furthermore, the transmitter signal receiver unit may be configured to continuously update a gate identifier list every time a gate identifier included in a transmitter signal is received and store the received gate identifier together with a time stamp in the gate identifier list.

Further, the mobile device may include a mobile device data storage unit, which may store the above-described gate identifier list. The mobile device data storage unit may preferably be an internal storage unit for storing a gate identifier list in a database which is preferably structured as a table, another suitable data format or the like. The data storage may be provided with the user's mobile device or another remote location. The data storage may also be distributed over different storage places.

The gate identifier list may be preferably stored in a table. The table may, for example, comprise a first column in which the received gate identifiers are listed, a second column in which the time stamps corresponding to the gate identifiers are listed, and a third column in which the corresponding signal strengths of the received transmitter signals are listed.

Furthermore, the passenger's mobile device may include a validation signal generator unit, which may select one of the received transmitter signals stored in the gate identifier list based on a signal characteristic such as the signal strength and/or the signal frequency of the received transmitter signals.

Preferably, the validation signal generator unit may read the gate identifier of the selected signal from the gate identifier list and generate a validation signal including the gate identifier of the selected transmitter signal and a user identifier of the passenger's mobile device.

Additionally, the passenger's mobile device may include a validation signal transmitter unit configured to transmit the generated validation signal to a plurality of gate control devices.

If a validation signal including the selected gate identifier is transmitted to the gate control units, the gate identifier list may be cleared.

The validation signal transmitter unit may transmit the validation signal via a wireless communication such as a wireless local area network, Bluetooth low energy (Bluetooth is a registered trademark), ultra-wideband and the like.

According to a preferred aspect of the system, each of the plurality of gate control devices may include a signal receiver unit, which may receive a validation signal from a mobile device of a passenger and a current user status from a user status management unit of a back office. The signal receiver unit may receive the validation signal from the passenger's mobile device via a wireless communication such as a wireless local area network, Bluetooth low energy (Bluetooth is a registered trademark), ultra-wideband and the like, and may receive the current user status from the user status management unit of the back office via a wireless data connection such as the internet, a mobile network, a wireless local area network and the like.

Furthermore, each of the plurality of gate control devices may include a signal analyser unit, which may compare a gate identifier included in the received validation signal with a gate identifier of a gate controlled by the gate control device and may determine an opening direction of the gate according to the received current user status. The signal analyser unit Additionally, each of the plurality of gate control devices may include a gate opening control unit which may control the gate to open if the gate identifier included in the received validation signal corresponds to the gate identifier of the gate controlled by the gate control device. Further, the gate opening control unit may control the gate to open in entrance direction if the current user status is "inside", and in exit direction if the current user status is "outside".

Further, it is noted that the configurations and aspects relating to the gates and the gate control devices may also be claimed separately from the mobile device and its configuration(s).

According to a further aspect, there is disclosed a method for automatically opening a gate of a public transport station. The method may comprise the steps: sending, by a plurality of transmitters, each transmitter being installed at one of a plurality of gates, transmitter signals each including a gate identifier identifying the respective gate; receiving, by a mobile device of a passenger reaching the plurality of gates, the plurality of transmitter signals; selecting, by the passenger's mobile device, one of the plurality of received transmitter signals based on a signal characteristic of the received transmitter signals; reading, by the passenger's mobile device, the gate identifier included in the selected transmitter signal; transmitting, by the passenger's mobile device, a validation signal including the gate identifier of the selected transmitter signal and a user identifier of the passenger's mobile device to a plurality of gate control devices controlling the plurality of gates; receiving, by each of the plurality of gate control devices, the validation signal from the passenger's mobile device; comparing, by each of the plurality of gate control devices, the gate identifier included in the received validation signal with a gate identifier of the gate controlled by the gate control device; and opening the gate, by the gate control device, if the gate identifier included in the received validation signal corresponds to the gate identifier of the gate controlled by the gate control device.

According to a preferred aspect, the method may further comprise the steps: receiving, by a user status management unit of a back office, a user status request including the user identifier of the passenger's mobile device from the gate control device controlling the gate to be opened; reading, by the user status management unit, a previous user status from the user status management table based on the user identifier included in the received status request; determining, by the user status management unit, a current user status based on the previous user status; transmitting, by the user status management unit, the current user status to the gate control device controlling the gate to be opened; receiving, by the gate control device controlling the gate to be opened, the current user status; and determining, by the gate control device controlling the gate to be opened, an opening direction of the gate according to the received current user status.

According to a preferred aspect of the method, the current user status may be determined to be "inside" by the user status management unit if no previous user status is stored in the user status management table, or if the previous user status stored in the user status management table is "outside", and the current user status may be determined to be "outside" if the previous user status stored in the user status management table is "inside".

According to a preferred aspect of the method, the gate to be opened may be controlled by the gate control device to open in entrance direction if the current user status is "inside" and to open in exit direction if the current user status is "outside".

According to a preferred aspect of the method, a current location of the user may be determined by the user status management unit based on the gate identifier included in the received status request, and the user status management table may be updated by the user status management unit according to the determined current user status and the determined current location of the passenger's mobile device.

In other words, each configuration of the claimed system shall also be encompassed by way of a method, which may be claimed by itself and/or by way of a computer program product claim in another aspect of the present disclosure.

Summarizing, the disclosed subject matter allows for improving the flow of passengers through a station by automatically opening the gate at which the user arrives when entering/leaving a station/a platform. This improvement can be achieved without increasing the computational and measuring effort of a present mobile computer based public transportation management system by using available technology already installed therein. In addition, it may be possible to optimize the route of the users within the station by opening the gate closest to the user with a short advance in order to guide him/her thereto. By determining the door opening direction on the basis of data already stored in the existing system, the user status does not have to be calculated, so that no additional computing effort is required.

In the following the claimed subject matter will be further explained based on at least one preferential example with reference to the attached drawings, wherein:

FIG. 3a shows an example of a gate identifier table;

FIG. 3b shows an example of a user status management table;

FIG. 3c shows an example of a gate identifier list showing received gate identifiers;

FIG. 1 shows schematically a passenger equipped with a mobile device (user) 100 reaching two exemplary gates 1200, 1300 of a public transport station, such as a train station or a bus station, from the outside of the station/platform. The depicted gates 1200, 1300 each comprise a turnstile 1220, 1320, a gate control device 1210, 1310 and a transmitter 1201, 1301.

Each transmitter 1201, 1301 may periodically or constantly send transmitter signals, such as radio signals, including a gate identifier that uniquely identifies the gate 1200, 1300 at which the transmitter 1201, 1301 is installed.

The depicted user 100 carries a mobile device 1100 that may receive the transmitter signals including the gate identifiers (illustrated as arrows with dotted lines) from the two transmitters 1201, 1301 installed at the gates 1200, 1300. After receiving the transmitter signals, the passenger's mobile device 1100 may store the gate identifiers included in the two transmitter signals in a gate identifier list and select the gate identifier included in the signal having the highest signal strength and/or signal frequency for generating a validation signal.

Subsequently, the passenger's mobile device 1100 may transmit the generated validation signal to the gate control devices 1210, 1310 of the two gates 1200, 1300 (illustrated as arrows with solid lines) and clear the gate identifier list. As a result, the gate control device 1210, 1310 controlling the gate 1200, 1300 having the gate identifier included in the validation signal may open the turnstile 1220, 1320 of the connected gate 1200, 1300. Each gate control device 1210, 1310 may, for example, receive the gate identifier of its connected gate 1200, 1300 from the transmitter 1201, 1301 installed at the gate 1200, 1300, or the respective gate identifier may be stored in a data storage of the gate control device 1210, 1310 of each gate 1200, 1300.

Figure 1:
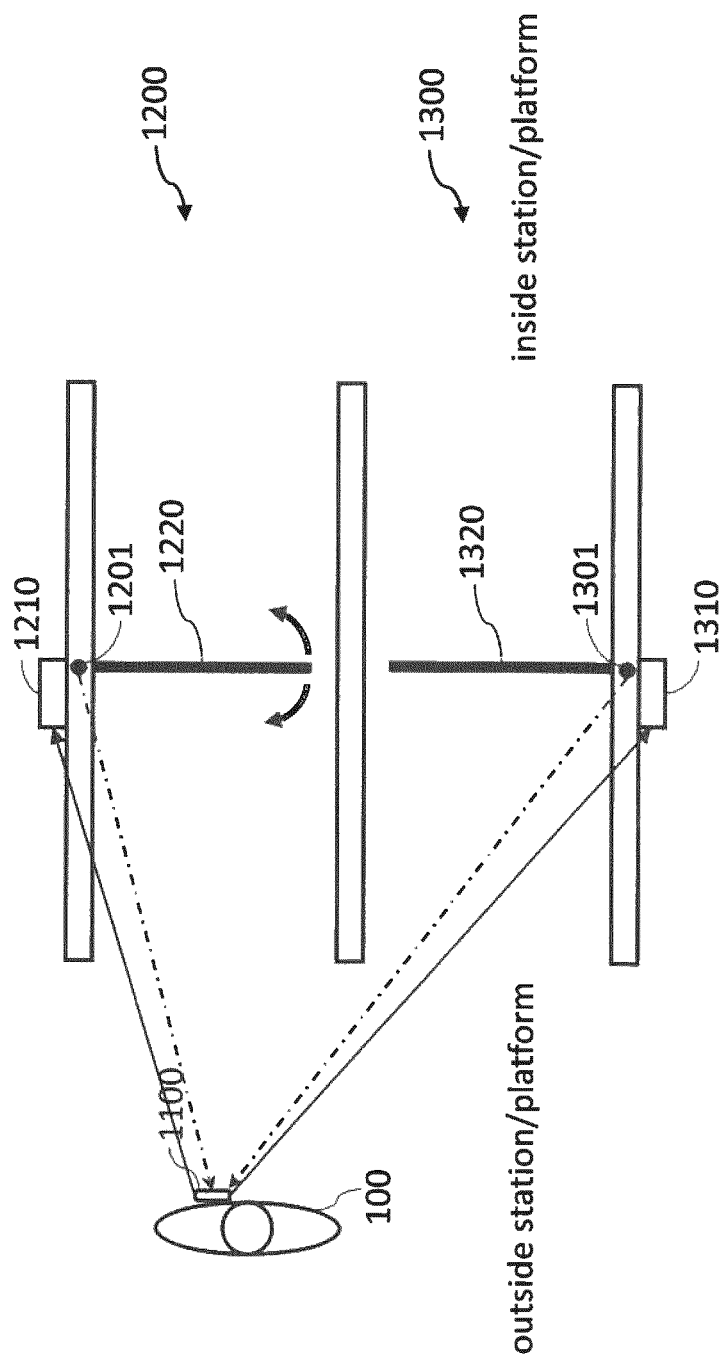
FIG. 1 shows schematically a passenger equipped with a mobile device (user) reaching two exemplary gates of a public transport station.

In the depicted example of FIG. 1 the gate 1200 is closer to the user 100, so that the passenger's mobile device 1100 may receive the signal having the highest signal strength/signal frequency from the transmitter 1201 installed at said gate 1200. Thus, the mobile device 1100 may generate a validation signal including the gate identifier of the gate 1200. The gate control devices 1210, 1310 may compare the gate identifier included in the validation signal with the gate identifier of their connected gate 1200, 1300. Since the gate identifier of the gate 1200 may be included in the validation signal, the gate control device 1210 may control the gate 1200 to open the turnstile 1220 (illustrated by curved arrows next to the turnstile 1220), so that the user 100 can enter the station/platform in the shortest possible way.

Figure 2:
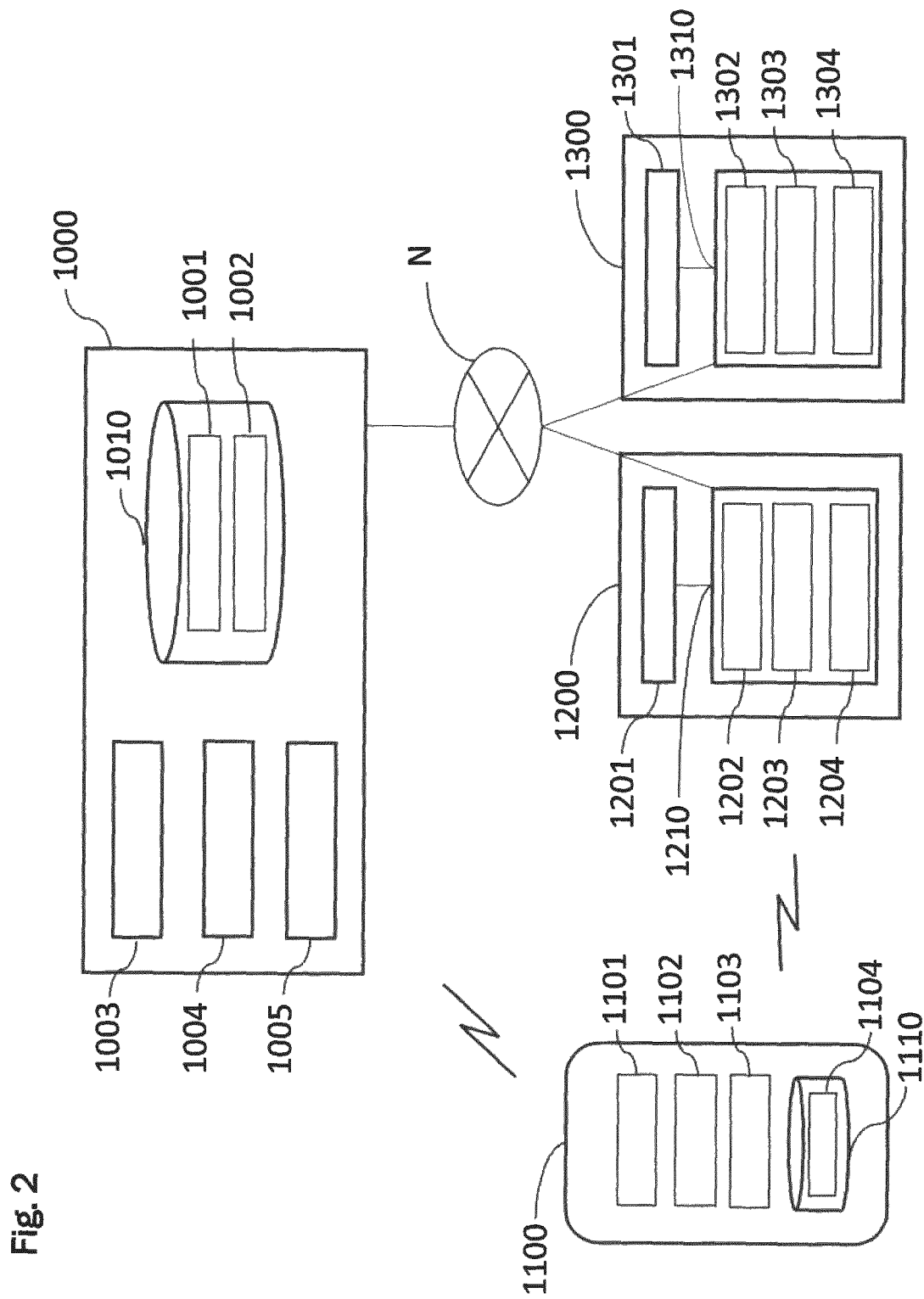
FIG. 2 shows an example of the claimed system for opening a gate of a public transport station.

FIG. 2 depicts schematically an example of the claimed system for opening a gate of a public transport station. The depicted system comprises a back office 1000, a mobile device 1100 of a passenger, at least two gates 1200, 1300 of a public transport station, and a network N which connects the back office 1000 and gate control devices 1210, 1310.

The two gates 1200, 1300, shown as an example for a plurality of gates, are each equipped with a transmitter 1201, 1301 and a gate control device 1210, 1310. It may also be possible that the transmitter 1201, 1301 is included in the gate control device 1210, 1310. Alternatively, it may also be possible that the gate control device 1210, 1310 is located remote from the gate. Each of the two gate control devices 1210, 1310 comprises a signal receiver unit 1202, 1302, a signal analyser unit 1203, 1303 and a gate opening control unit 1204, 1304.

The passenger's mobile device 1100 comprises a transmitter signal receiver unit 1101, a mobile device data storage unit 1110, in which a gate identifier list 1104 is stored, a validation signal generator unit 1102 and a validation signal transmitter unit 1103.

The back office 1000 includes a back-office data storage unit 1010, in which a gate identifier table 1001 and a user status management table 1002 is stored, as well as a user status management unit 1003, a journey history calculation unit 1004 and a fare calculation unit 1005. Alternatively or additionally, the user status management table 1002 may be stored in the passenger's mobile device 1100. The back office 1000 may be connected to the gate control devices 1210, 1310 via a wireless data connection such as the Internet or a wireless local area network. Furthermore, the back office 1000 may be connected to the mobile device 1100 via a mobile network.

The transmitters 1201, 1301 installed at the gates 1200, 1300 may emit transmitter signals via a radio signal in a predefined range around the transmitter 1201, 1301 periodically and/or constantly. Each transmitter signal may include a gate identifier clearly identifying the gate 1200, 1300 at which the transmitter 1201, 1301 is installed. The transmitter signal receiver unit 1101 of the mobile device 1100 may receive the transmitter signals including the gate identifiers from the two transmitters 1201, 1301, and may write the gate identifiers included in the two transmitter signals together with a time stamp in a gate identifier list 1104, which is stored in the mobile device data storage unit 1110. An exemplary structure of a gate identifier list 1104 will be described below in connection with FIG. 3c.

The validation signal generator unit 1102 of the passenger's mobile device 1100 may select one of the received transmitter signals stored in the gate identifier list 1104 based on a signal characteristic such as the signal strength and/or the signal frequency of the received transmitter signals. Subsequently, the validation signal generator unit 1102 may read the gate identifier of the selected signal from the gate identifier list 1104 and generate a validation signal including the gate identifier of the selected transmitter signal and a user identifier of the passenger's mobile device 1100. In a next step, the validation signal transmitter unit 1103 of the passenger's mobile device 1100 may transmit the generated validation signal to the gate control devices 1210, 1310 via the signal receiver unit 1202, 1302 of each gate control device 1210, 1310. If a validation signal including the selected gate identifier is transmitted to the gate control units 1210, 1310, the gate identifier list 1104 may be cleared. The validation signal transmitter unit 1103 may transmit the validation signal via a wireless communication such as a wireless local area network, Bluetooth low energy (Bluetooth is a registered trademark), ultra-wideband and the like.

Subsequently, the signal analyser unit 1203, 1303 of each gate control device 1210, 1310 may compare the gate identifier included in the received validation signal with a gate identifier of the gate 1200, 1300 controlled by the respective gate control device 1210, 1310. If the signal analyser unit 1203, 1303 of a gate control device 1210, 1310 determines that the received gate identifier matches to the gate identifier of the gate 1200, 1300 controlled by the gate control device 1210, 1310, the respective gate control unit 1210, 1310 may transmit a user status request to the user status management unit 1003 of the back office 100.

When the user status management unit 1003 receives a user status request from the gate control device 1210, 1310 controlling the gate to be opened, it may read a previous user status from the user status management table 1002 based on the user identifier included in the received status request. An exemplary structure of a user status management table 1002 will be described below in connection with FIG. 3b.

The user status management unit 1003 may then determine a current user status based on the previous user status, and transmit the current user status to the gate control device from which it has received the user status request. In response, the signal receiver unit 1103 of the respective gate control device may receive the current user status based on which the signal analyser unit 1203 of the gate control device 1210, 1310 may determine an opening direction of the gate 1200, 1300. Then the gate opening control unit 1204, 1304 of the gate control device 1210, 1310 may control the gate 1200, 1300 to open in the determined direction.

Additionally, the user status management unit 1003 of the back office 1000 may determine a current location of a user 100 based on the gate identifier included in the received user status request. The current location of the user 100 can be determined by determining the location of the gate 1200, 1300 that the user 100 has just passed using the gate identifier table 1001 stored in the back-office data storage unit 1010, in which each gate identifier may be listed in connection with the location of the corresponding gate. An exemplary structure of a gate identifier table 1001 will be described below in connection with FIG. 3a.

Subsequently, the user status management unit 1003 may update the user status management table 1002 according to the determined current user status and the determined current location of the user 100.

Additionally, the depicted back office includes a journey history calculation unit 1003 and a fare calculation unit 1005. The journey history calculation unit 1003 may calculate the journey of a passenger from a travel start station and a travel end station. The travel start station may be the station of public transport, such as a bus station or a train station, where a passenger started a passenger journey and correspondingly the travel end station may be the station of public transport where a passenger ended a passenger journey. Based on a travel start station and a travel end station, a total distance which a passenger travelled during a passenger journey can be determined.

The fare calculation unit 1005 may calculate a corresponding fare that has to be paid by the passenger for the use of means of public transport in order to get from the travel start station to the travel end station according to the distance between the travel start station and the travel end station calculated by the journey history calculation unit 1004.

FIG. 3a shows an example of a gate identifier table 1001. The gate identifier table may preferably be configured to store a gate identifier corresponding to a location of the gate 1200, 1300 identified by the gate identifier. In the first column of the depicted exemplary gate identifier table 1001, gate identifiers (Gate ID) of several gates 1200, 1300 are listed, and in the second column the locations of the gates 1200, 1300 corresponding to the gate identifiers are listed. The gate identifier table 1001 indicates that the gates having the Gate IDs 01000 and 01001 are located at Station A. and the gates having the Gate IDs 02000 to 02002 are located at Station B.

FIG. 3b shows an example of a user status management table 1002. The user status management table 1002 may preferably be configured to store a user identifier of each passenger's mobile device, a location of a user, a time stamp indicating the time of determining the location of the user and the user status. In the first column of the depicted exemplary user status management table 1002, several users are listed, in the second column the different locations of the users are listed, in the third column the time stamps of determining the user locations are listed and in the fourth column the different user status are listed.

According to the information provided in the tables 1001 and 1002, the user status management unit 1003 may determine that User A, having a previous user status "In", is located outside of Station A if he/she passes one of the gates with the gate IDs 01000 and 01001. Accordingly, the user status management unit 1003 may determine that User B is located outside of Station B if he/she passes one of the gates having the Gate IDs 02000 to 02003. In terms of User C, having a previous user status "Out", the user status management unit 1003 may determine that User C is located inside Station A if he/she passes one of the gates with the Gate IDs 01000 and 01001, and that User C is located inside Station B if he/she passes one of the gates with the Gate IDs 02000 to 02002.

FIG. 3c shows an example of a gate identifier list showing received gate identifiers each provided with a time stamp. The first column of the depicted exemplary gate identifier list 1104 indicates the time stamps at which the Gate IDs listed in the second column are received. The third column indicates the RSSI value of the received transmitter signals. According to the information provided in the gate identifier list 1104, the gate having the Gate ID 1001 is closer to the user reaching the gates of Station A, since the corresponding RSSI value of the transmitter signal received by the user's mobile device is higher (closer to 0 dBm). Thus, the user's mobile device may select this transmitter signal and transmit a validation signal including the Gate ID 1001 to the gate control devices of the two gates of Station A. After comparing the received Gate ID with the gates' Gate IDs, the gate control device connected to the gate with the gate ID 1001 may control the gate to open.

Figure 4:
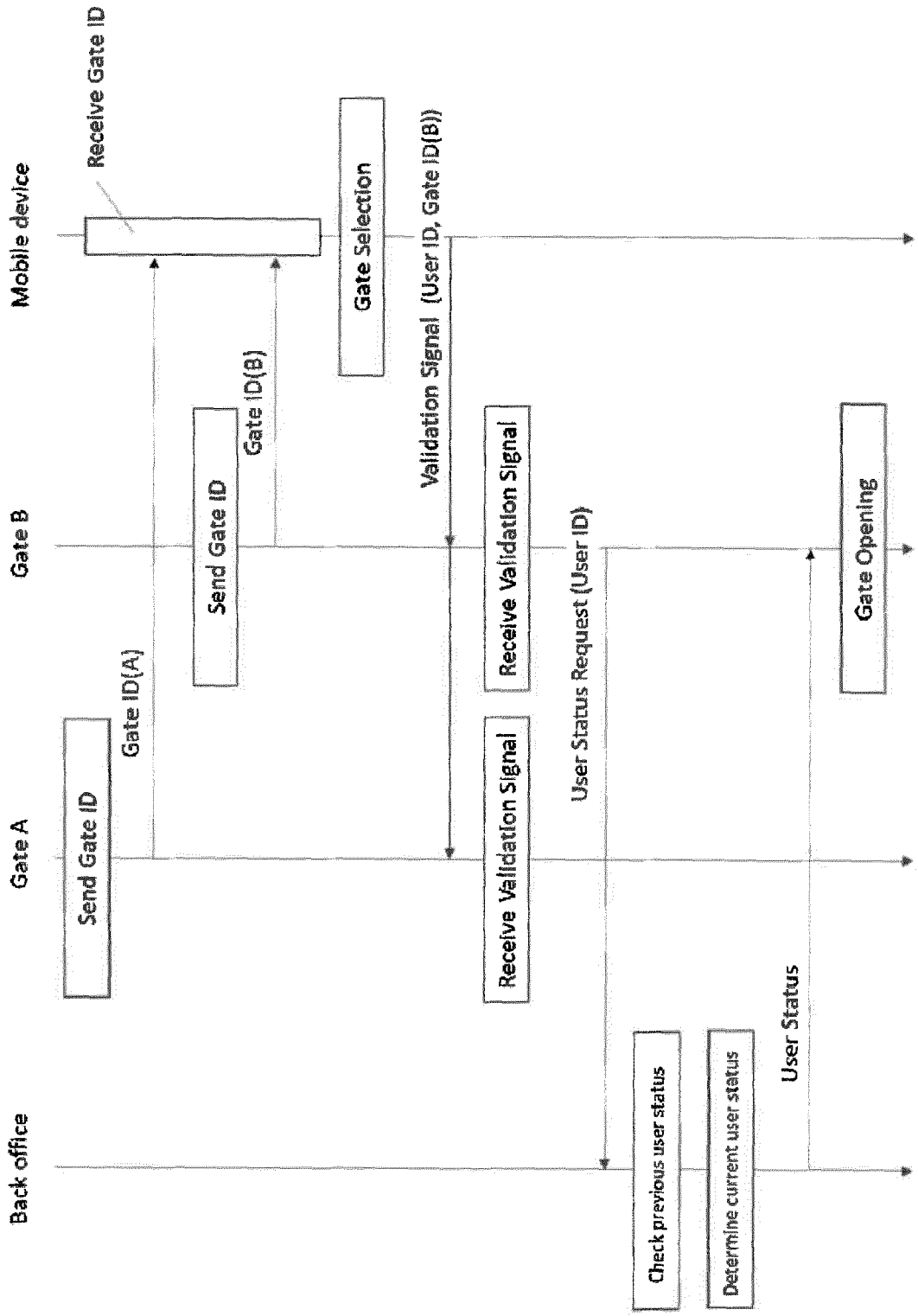
FIG. 4 shows schematically an example of a signal flow between the devices of the claimed system.

FIG. 4 shows schematically an example of a signal flow between devices of the claimed system. The respective gate IDs (gate ID(A), gate ID(B)) are transmitted from gate A and gate B to the mobile device, which receives both gate IDs and selects the gate ID(B) to generate a validation signal, since Gate B is closer to the mobile device. The generated validation signal including a User ID and the Gate ID(B) is transmitted from the mobile device to both gates, each comprising a gate control device. Both gate control devices compare the Gate ID(B) included in the validation signal with the Gate ID of their gate. Since the received Gate ID(B) matches to the Gate ID of Gate B, the gate control device of Gate B transmits a user status request including the received User ID to the back office. The back office checks the previous user status, determines a current user status and transmits the current user status to the control device of Gate B. The control device of Gate B then controls the Gate B to open the gate.

Figure 5:
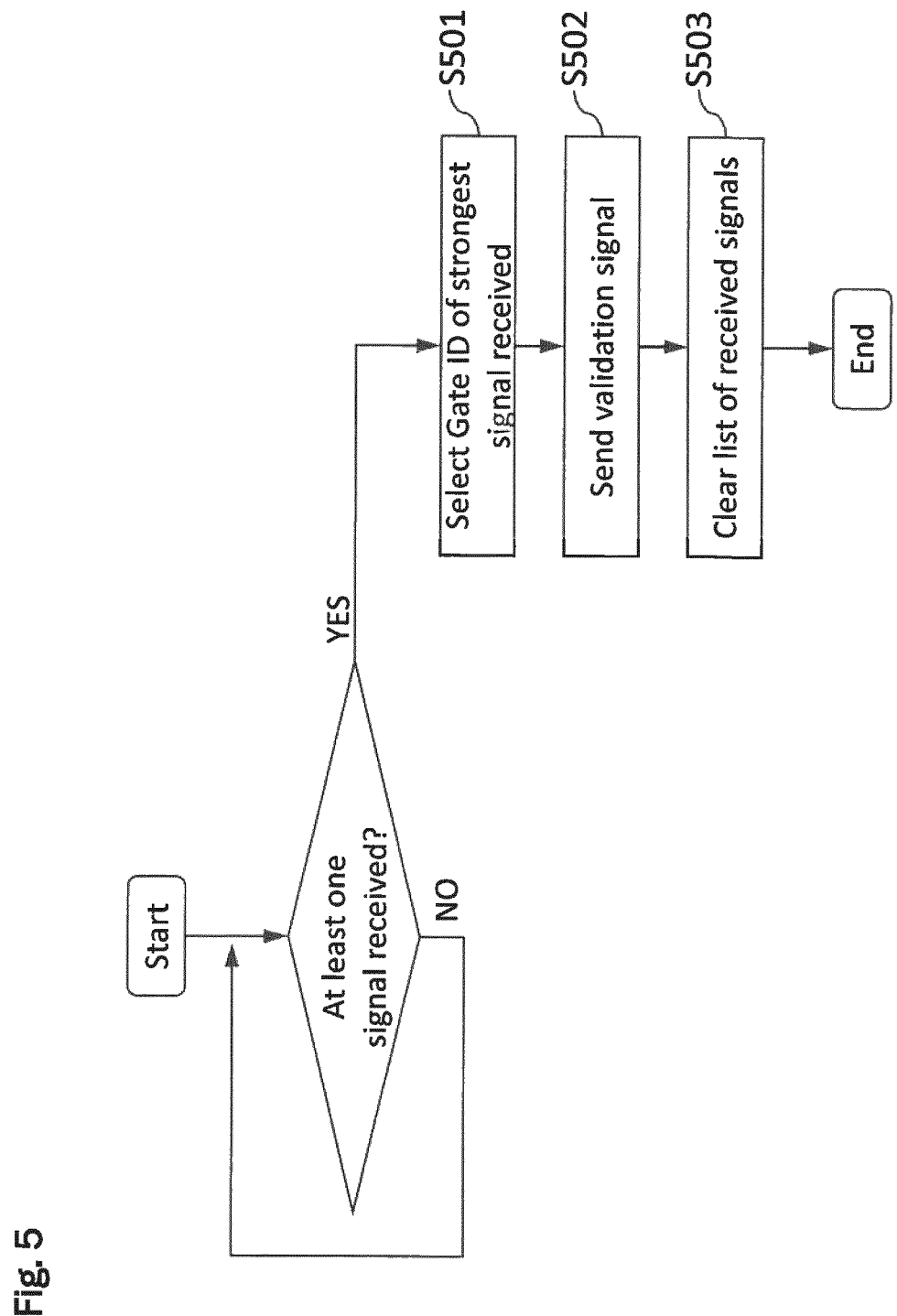
FIG. 5 shows a flow chart that exemplary illustrates a selection of a gate identifier.

FIG. 5 shows a flow chart that exemplary illustrates a selection of a gate identifier by a passenger's mobile device depending on the signal strength of the received transmitter signals. After starting the selection process, it is first checked whether the mobile device has received at least one transmitter signal from the plurality of transmitters installed at a plurality of gates. If no signal has been transmitted to the mobile device so far, the mobile device may continue to receive transmitter signals. If one or more signals have been received by the mobile device, the mobile device may select the Gate ID of the strongest signal received for generating a validation signal (S501). In the next step S502, the mobile device may send the validation signal to the gate control units, and in step S503 the mobile device may clear the list of received signals (gate identifier list). Then the mobile device may finish the selection process.

Figure 6:
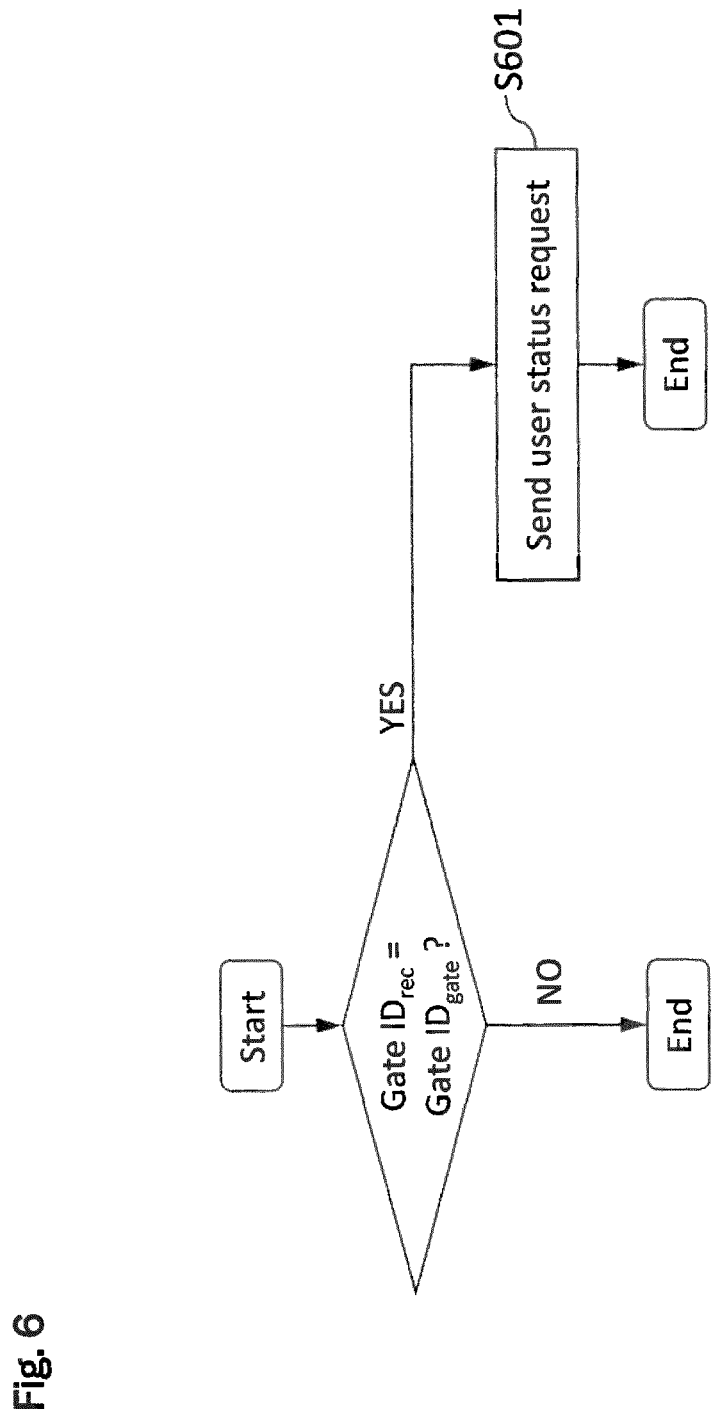
FIG. 6 shows a flow chart that exemplary illustrates analysing of a validation signal.

FIG. 6 shows a flow chart that exemplary illustrates analysing of a validation signal by a plurality of gate control devices after receiving the validation signal. After starting the process, each gate control device compares the gate identifier included in the received validation signal Gate $ID_{rec}$ with the gate identifier Gate $ID_{gate}$ of the gate to which a gate control device is connected. If both gate identifiers do not match, the respective gate control device may finish the process. If both gate identifiers do match, the respective gate control device may send a user status request to the back office (S601) before the process is finished.

Figure 7:
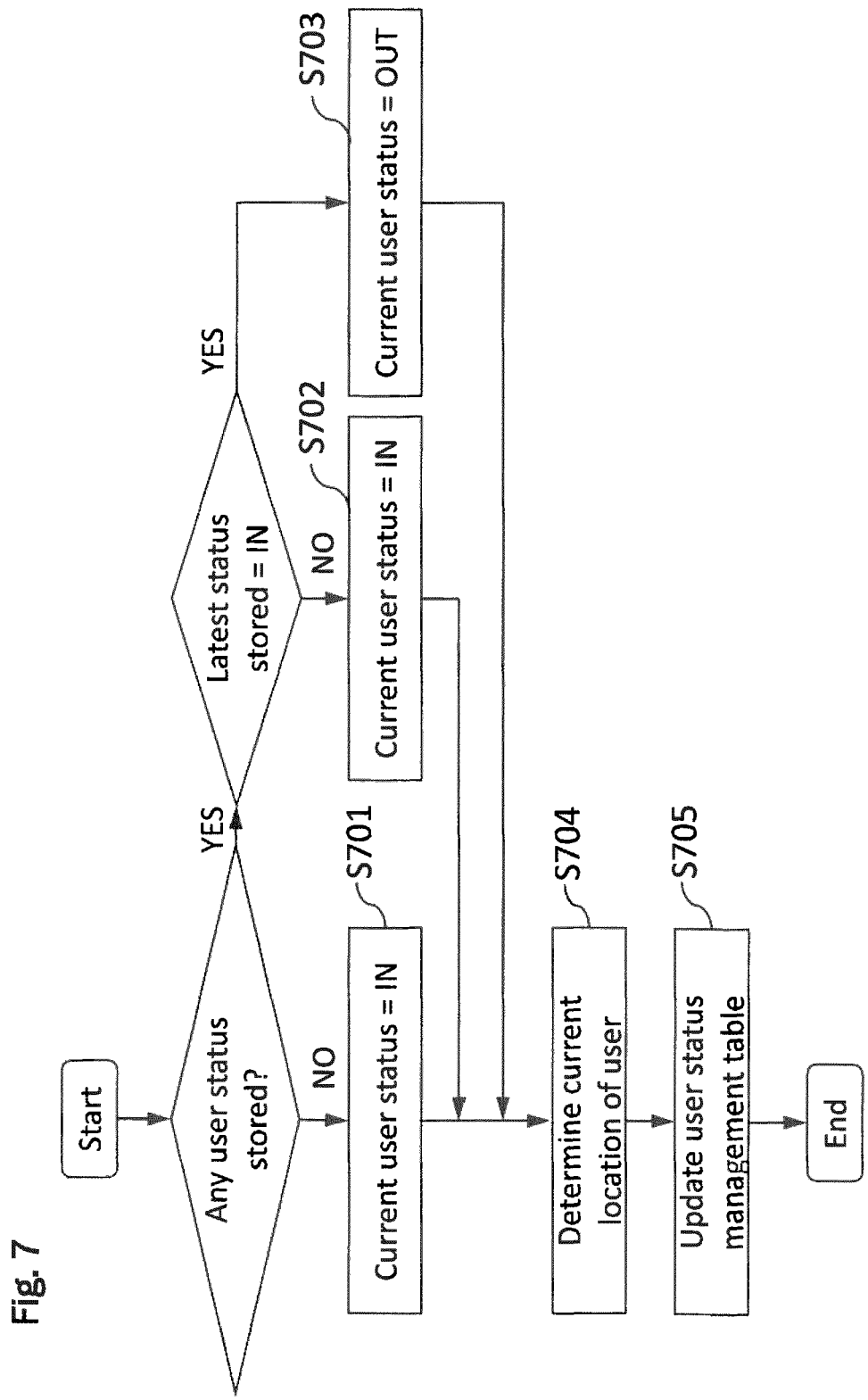
FIG. 7 shows a flow chart that exemplary illustrates determining a user status.

FIG. 7 shows a flow chart that exemplary illustrates determining a user status by a back office. After starting the process, a user status management unit of the back office firstly checks whether any user status assigned to the received user identifier is stored in a user status management table. If no user status is available the current user status may be determined to be "inside" (S701). If the latest user status stored in the user status management table states "inside", the current user status may be determined to be "outside" (S703), otherwise the current user status may be determined to be "inside" (S702). In the following step S704, the current location of the user may be determined and then the user status management table may be updated (S705) by the user status management unit before the process is finished.

Figure 8:
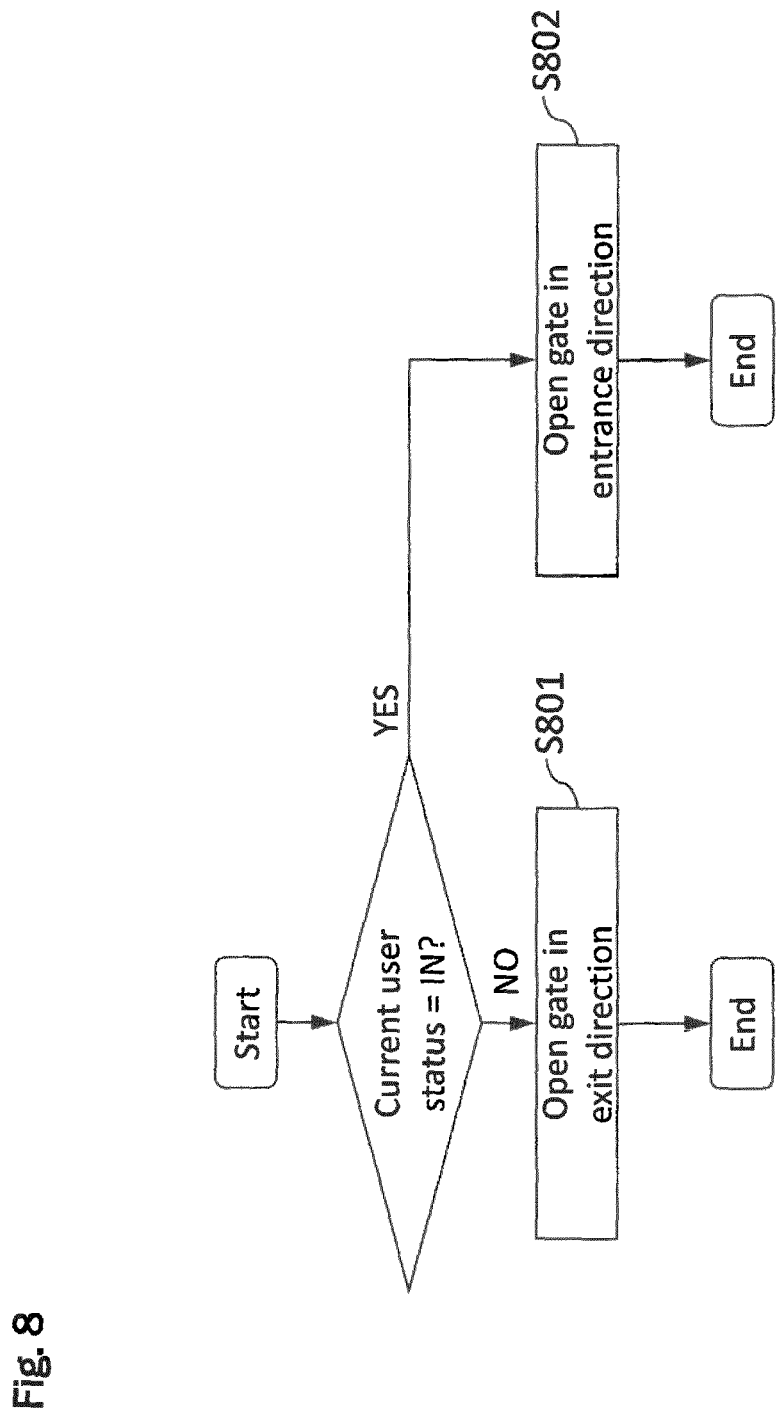
FIG. 8 shows a flow chart that exemplary illustrates a process of controlling gate opening according to a user status.

FIG. 8 shows a flow chart that exemplary illustrates a process of controlling gate opening according to a user status by a gate control device. After starting the process, the gate control device checks whether the current user status of the user intending to pass the gate is stated to be "inside" or "IN" (instead of "OUT"). If this is the case, the gate control device controls the gate to open in the entrance direction (S802), otherwise the gate control device controls the gate to open in the exit direction (S801) before it finishes the process. It other words, the current user status may preferably be updated before the passenger passes the gate. In even other words, a decision of opening the gate may preferably always follow after an updating of the passenger's status. Accordingly, the current user status of a passenger who will be approaching a gate for going out from the station will be "OUT" so that the gate opens in the exit direction and a passenger who will be approaching a gate for entering into the station will be "IN" so that the gate opens in the entrance direction. The above preferred example of the opening directions may also be vice versa without departing from the principle technical idea explained herein.

Summarizing, the present disclosure provides a system, a method and a computer program product for automatically opening a gate of a public transport station. The disclosed subject matter is part of a mobile computer based public transportation management system and allows for improving the flow of passengers through a station, inter alia, by optimizing the route of a passenger equipped with a mobile device (user) within the station without increasing the computational effort of an existing system. The disclosed subject matter offers the advantage that available technology, which is already used in current mobile computer based public transportation management systems can be additionally used to improve the passenger flow. Thus, no further measuring equipment is needed. By determining the door opening direction on the basis of data already stored in the existing system, the user status does not have to be calculated, so that no additional computing effort is required.

As will be appreciated by one of skill in the art, the present disclosure, as described hereinabove and the accompanying figures, may be embodied as a method, an apparatus (including a device, machine, system, computer program product, and/or any other apparatus), or a combination of the foregoing.

Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system". Furthermore, embodiments of the present disclosure may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally may indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Aspects are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment.

It should be noted that terms such as "server" and "processor" may be used herein to describe devices that may be used in certain embodiments and should not be construed to limit to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth (registered trademark)), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present disclosure should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects and should not be construed to limit the disclosure to any particular logic flow or logic implementation. The described logic may be partitioned into different logic blocks (e.g., programs, modules, functions, or subroutines) without changing the overall results.

Often times, logic elements may be added, modified, omitted, performed in a different order, or implemented using different logic constructs (e.g., logic gates, looping primitives, conditional logic, and other logic constructs) without changing the overall results.

The present disclosure may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" may refer generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth (registered trademark)), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some aspects may be implemented as a combination of both software (e.g., a computer program product) and hardware. Still other embodiments of the may be implemented as entirely hardware, or entirely software.

While certain exemplary aspects have been described and shown in the accompanying drawings, it is to be understood that such aspects are illustrative, and that the embodiments are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured. Therefore, it is to be understood that, within the scope of the appended claims, the disclosure may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments or aspects described herein may be combined to form other embodiments.

The invention claimed is:

1. A gate system comprising a plurality of gates of a public transport station configured to open a gate automatically, the gate system comprising:

a plurality of transmitters, each transmitter being installed at one of a plurality of gates and configured to send a transmitter signal including a gate identifier identifying the respective gate;

a plurality of gate control devices, each gate control device configured to receive a validation signal from a passenger's mobile device, the validation signal including a gate identifier from a transmitter signal selected by the mobile device based on signal frequencies of a plurality of transmitter signals, compare the gate identifier included in the received validation signal with a gate identifier of the gate controlled by the gate control device, and open the gate if the gate identifier included in the received validation signal corresponds to the gate identifier of the gate controlled by the gate control device.

2. A system for opening a gate of a public transport station automatically comprising:

a plurality of transmitters, each transmitter being installed at one of a plurality of gates and configured to send a transmitter signal including a gate identifier identifying the respective gate;

at least one mobile device of a passenger reaching the plurality of gates, the passenger's mobile device configured to receive a plurality of transmitter signals from the plurality of transmitters, select one of the plurality of received transmitter signals based on a signal frequency of the received transmitter signals, read the gate identifier included in the selected transmitter signal, and transmit a validation signal including the gate identifier of the selected transmitter signal and a user identifier of the passenger's mobile device to a plurality of gate control devices controlling the plurality of gate;

the plurality of gate control device, each gate control device configured to receive the validation signal from the passenger's mobile device, compare the gate identifier included in the received validation signal with a gate identifier of the gate controlled by the gate control device, and open the gate if the gate identifier included in the received validation signal corresponds to the gate identifier of the gate controlled by the gate control device.

3. The system according to claim 2, wherein the mobile device selects one of the received transmitter signals based on a signal strength and the signal frequency.

4. The system according to claim 2 comprising:

a back office including:

a back-office data storage unit configured to store user status data of a plurality of users in a user status management table;

a user status management unit configured to receive a user status request including the user identifier of the passenger's mobile device from the gate control device controlling the gate to be opened, read a previous user status from the user status management table based on the user identifier included in the received status request, determine a current user status based on the previous user status, and transmit the current user status to the gate control device controlling the gate to be opened, wherein the gate control device controlling the gate to be opened is configured to
receive the current user status, and
determine an opening direction of the gate according to the received current user status.

5. The system according to claim 4, wherein the user status management unit of the back office is configured to
determine the current user status to be "inside" if no previous user status is stored in the user status management table, or if the previous user status stored in the user status management table is "outside", and
determine the current user status to be "outside" if the previous user status stored in the user status management table is "inside".

6. The system according to claim 5, wherein the gate control device is configured to
control the gate to be opened to open in entrance direction if the current user status is "inside", and
control the gate to be opened in exit direction if the current user status is "outside".

7. The system according to claim 4, wherein the user status management unit of the back office is configured to
determine a current location of a user based on the gate identifier included in the received status request, and
update the user status management table according to the determined current user status and the determined current location of the user.

8. The system according to claim 2, wherein the passenger's mobile device includes
a transmitter signal receiver unit configured to
receive a plurality of transmitter signals each including a gate identifier from a plurality of transmitters installed at a plurality of gates;
a mobile device data storage unit configured to store a gate identifier list comprising the gate identifiers included in the plurality of transmitter signals received from the plurality of transmitters;
a validation signal generator unit configured to
select one of the plurality of received transmitter signals stored in the gate identifier list based on a signal frequency of the received transmitter signals,
read the gate identifier included in the selected signal from the gate identifier list, and
generate a validation signal including the gate identifier of the selected transmitter signal and a user identifier of the passenger's mobile device; and
a validation signal transmitter unit configured to
transmit the generated validation signal to a plurality of gate control devices.

9. The system according to claim 2, wherein each of the plurality of gate control devices includes
a signal receiver unit configured to receive
a validation signal from a mobile device of a passenger, and
a current user status from a user status management unit of a back office,
a signal analyser unit configured to
compare a gate identifier included in the received validation signal with a gate identifier of a gate controlled by the gate control device, and
determine an opening direction of the gate according to the received current user status;
a gate opening control unit configured to
control the gate to open if the gate identifier included in the received validation signal corresponds to the gate identifier of the gate controlled by the gate control device,
control the gate open in entrance direction if the current user status is "inside", and
control the gate to open in exit direction if the current user status is "outside".

10. A method for automatically opening a gate of a public transport station comprising the steps:
sending, by a plurality of transmitters, each transmitter being installed at one of a plurality of gates, transmitter signals each including a gate identifier identifying the respective gate;
receiving, by a mobile device of a passenger reaching the plurality of gates, the plurality of transmitter signals;
selecting, by the passenger's mobile device, one of the plurality of received transmitter signals based on a signal frequency of the received transmitter signals;
reading, by the passenger's mobile device, the gate identifier included in the selected transmitter signal;
transmitting, by the passenger's mobile device, a validation signal including the gate identifier of the selected transmitter signal and a user identifier of the passenger's mobile device to a plurality of gate control devices controlling the plurality of gates;
receiving, by each of the plurality of gate control devices, the validation signal from the passenger's mobile device;
comparing, by each of the plurality of gate control devices, the gate identifier included in the received validation signal with a gate identifier of the gate controlled by the gate control device; and
opening the gate, by the gate control device if the gate identifier included in the received validation signal corresponds to the gate identifier of the gate controlled by the gate control device.

11. The method according to claim 10 comprising the steps:
receiving, by a user status management unit of a back office, a user status request including the user identifier of the passenger's mobile device from the gate control device controlling the gate to be opened;
reading, by the user status management unit, a previous user status from the user status management table based on the user identifier included in the received status request;
determining, by the user status management unit, a current user status based on the previous user status;
transmitting, by the user status management unit, the current user status to the gate control device controlling the gate to be opened;
receiving, by the gate control device controlling the gate to be opened, the current user status; and
determining, by the gate control device controlling the gate to be opened, an opening direction of the gate according to the received current user status.

12. The method according to claim 11, wherein
the current user status is determined to be "inside" by the user status management unit if no previous user status is stored in the user status management table, or if the previous user status stored in the user status management table is "outside", and
the current user status is determined to be "outside" by the user status management unit if the previous user status stored in the user status management table is "inside".

13. The method according to claim 12, wherein
the gate to be opened is controlled by the gate control device to open in entrance direction if the current user status is "inside", and the gate to be opened is controlled by the gate control device to open in exit direction if the current user status is "outside".

14. The method according to claim 10, wherein a current location of a user is determined by the user status management unit based on the gate identifier included in the received status request, and the user status management table is updated by the user status management unit according to the determined current user status and the determined current location of the user.

15. A non-transitory computer-readable medium storing a program comprising instructions which, when carried out by a computer, causes the computer to perform the method according to claim 10.

* * * * *